(12) United States Patent
Nobuoka et al.

(10) Patent No.: US 10,552,703 B2
(45) Date of Patent: Feb. 4, 2020

(54) ARTICLE RECOGNITION APPARATUS, SETTLEMENT APPARATUS AND ARTICLE RECOGNITION METHOD

(71) Applicant: TOSHIBA TEC KABUSHIKI KAISHA, Tokyo (JP)

(72) Inventors: Tetsuya Nobuoka, Sunto Shizuoka (JP); Masaaki Yasunaga, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/231,202

(22) Filed: Dec. 21, 2018

(65) Prior Publication Data

US 2019/0122066 A1     Apr. 25, 2019

Related U.S. Application Data

(63) Continuation of application No. 15/434,387, filed on Feb. 16, 2017, now Pat. No. 10,198,651.

(51) Int. Cl.
| | |
|---|---|
| *G06K 9/00* | (2006.01) |
| *G06K 9/34* | (2006.01) |
| *G06K 9/32* | (2006.01) |
| *G06K 9/46* | (2006.01) |
| *G06T 7/00* | (2017.01) |

(52) U.S. Cl.
CPC .......... *G06K 9/34* (2013.01); *G06K 9/00201* (2013.01); *G06K 9/00624* (2013.01); *G06K 9/3233* (2013.01); *G06K 9/4604* (2013.01)

(58) Field of Classification Search
CPC .............................. G06K 9/00; G06Q 30/012
USPC ........................................... 382/103; 348/169
See application file for complete search history.

(56) References Cited

U.S. PATENT DOCUMENTS

| | | | |
|---|---|---|---|
| 8,525,754 B2 * | 9/2013 | Sumiyoshi | ............... G09G 5/00 345/4 |
| 2016/0171755 A1 | 6/2016 | Karsch et al. | |
| 2016/0379076 A1 | 12/2016 | Nobuoka et al. | |
| 2017/0011378 A1 | 1/2017 | Inoue et al. | |

FOREIGN PATENT DOCUMENTS

| | | |
|---|---|---|
| WO | 2013033442 A1 | 3/2013 |
| WO | 2015140855 A1 | 9/2015 |

OTHER PUBLICATIONS

Extended European Search Report dated Jul. 26, 2018, tiled in counterpart European Patent Application No. 18154645.8 (7 pages).

* cited by examiner

*Primary Examiner* — Abolfazl Tabatabai
(74) *Attorney, Agent, or Firm* — Kim & Stewart LLP (57) ABSTRACT

According to one embodiment, an article recognition apparatus includes a first interface, a second interface, and a processor. The first interface acquires an image captured by photographing a photography range including an area where articles that are recognition targets are arranged. The second interface acquires depth information from a predetermined position relative to an area corresponding to the photography range. The processor extracts image areas of all products existing in the image by using the depth information, and determines whether an unidentified area due to overlapping of a plurality of the products exists in the image, based on the image areas of the products extracted from the image.

5 Claims, 5 Drawing Sheets

ARTICLE RECOGNITION APPARATUS, SETTLEMENT APPARATUS AND ARTICLE RECOGNITION METHOD

CROSS-REFERENCE TO RELATED APPLICATION

This application is a continuation of U.S. patent application Ser. No. 15/434,387, filed on Feb. 16, 2017, the entire contents of which are incorporated herein by reference.

FIELD

Embodiments described herein relate generally to an article recognition apparatus, a settlement apparatus and an article recognition method.

BACKGROUND

An article recognition apparatus, which recognizes a plurality of articles (target objects) from a photography image, is now in practical use. The article recognition apparatus executes a process of specifying image areas of articles from a photography image captured by photographing a photography area including an area where the articles are arranged, and identifying the articles in the specified image areas of the articles. In some cases, in a photography image captured by photographing a plurality of articles from above, there occurs an area (hereinafter referred to as "unidentified area") where articles cannot be detected due to overlapping disposition of a plurality of the articles.

In related art, there is known a method of generating a three-dimensional (3D) image from a photographed image, specifying a product area by utilizing the 3D image, and recognizing a product existing in the specified product area. In this related art, however, it is assumed that the target of recognition is one product, and it is not assumed that products overlap each other. Specifically, this conventional article recognition apparatus cannot detect (recognize) a product existing in an unidentified area which occurs due to overlapping of a plurality of products. A settlement apparatus using such an article recognition apparatus would possibly execute a settlement process with a price lower than a correct price, if an undetectable product exists in the unidentified area.

DETAILED DESCRIPTION

In general, according to one embodiment, an article recognition apparatus includes a first interface, a second interface, and a processor. The first interface acquires an image captured by photographing a photography range including an area where articles that are recognition targets are arranged. The second interface acquires depth information from a predetermined position relative to an area corresponding to the photography range. The processor extracts image areas of all products existing in the image by using the depth information, and determines whether an unidentified area due to overlapping of a plurality of the products exists in the image, based on the image areas of the products extracted from the image.

Embodiments will be described hereinafter with reference to the accompanying drawings.

An article recognition apparatus according to an embodiment will be described.

A settlement apparatus to be described below includes an article recognition apparatus which detects articles (products) from a photography image, and recognizes (identifies) the detected articles. However, the article recognition apparatus according to the embodiment is not limited to the apparatus which detects and recognizes products that are settlement targets, and it should suffice if the apparatus detects all articles existing in a photography image. For example, the article recognition apparatus may be an apparatus which detects articles existing in a photography image in order to count the number of articles.

Figure 1:
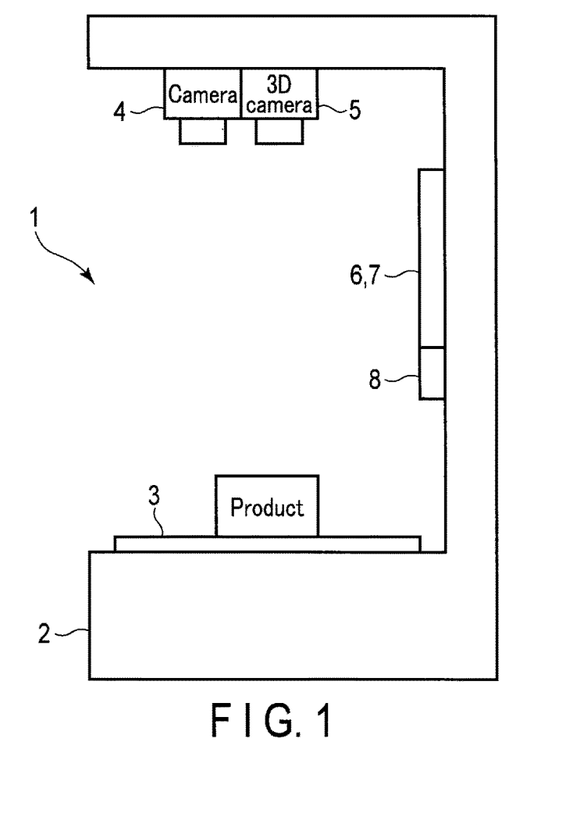
FIG. 1 is a view which schematically illustrates an example of an external-appearance configuration of a settlement apparatus including an article recognition apparatus according to an embodiment.

FIG. 1 is a view which schematically illustrates an example of an external-appearance configuration of the settlement apparatus 1 including the article recognition apparatus of the embodiment.

As illustrated in FIG. 1, the settlement apparatus 1 includes a housing 2, a product table 3, a camera 4, a 3D camera 5, a display 6, an operation panel 7 and a settlement unit 8. The settlement apparatus 1 includes a function as an article recognition apparatus which recognizes products as articles, and a settlement function of settling the payment of products. The settlement apparatus 1 recognizes products that are settlement targets by the function as the article recognition apparatus, and settles the payment of the recognized products by the settlement function. The settlement apparatus 1 is installed, for example, in a store which sells products. The settlement apparatus 1 may be installed as a self-checkout system which a user operates by himself/herself.

In addition, the settlement apparatus 1 may be installed as a cash register which a salesclerk of the store operates. The settlement apparatus 1 executes a settlement process on all products placed on the product table 3. For example, the products that are settlement targets may be directly placed on the product table 3, or may be placed on the product table 3 in the state in which the products are put in a basket.

The housing 2 forms the outer shape of the settlement apparatus 1. The housing 2 may have any shape which enables disposition of respective parts, and the shape of the housing 2 is not limited to a specific shape. In the example illustrated in FIG. 1, the housing 2 has such a shape that the camera 4 and 3D camera 5 are disposed above the product table 3. In addition, the housing 2 houses a computer including a processing unit which includes a processor, a storage and various interfaces. For example, the computer housed in the housing 2 realizes a process as the article recognition apparatus.

The settlement apparatus 1 functioning as the article recognition apparatus photographs, by the camera 4 and 3D camera 5, a photography range including the product table 3. The settlement apparatus 1 functioning as the article recognition apparatus detects and recognizes respective products existing in a photography image which the camera 4 acquires, by using a distance image as depth information which the 3D camera 5 acquires. The settlement apparatus 1 detects all products from the photography image which the camera 4 acquires, recognizes the detected products, and executes a settlement process on all recognized products.

The product table 3 includes a surface on which products that are settlement targets (recognition targets) are placed. The surface of the product table 3, on which the products are placed, serves as an area (article disposition area) where all products that are settlement targets are disposed. For example, the product table 3 may be configured such that the surface, on which articles are placed, is painted with a predetermined pattern (e.g. black). In addition, the product table 3 may be configured such that a basket, in which products that are recognition targets are contained, is placed on the product table 3. The product table 3 is set such that the article disposition area falls within the photography range of the camera 4. Besides, the product table 3 may be configured as a conveyor device, such as a belt conveyor, which conveys a plurality of articles that are recognition targets in the state in which these articles are placed on the conveyor device.

The camera 4 photographs, as a photography range, an area including the article disposition area of the product table 3. In the configuration example illustrated in FIG. 1, the camera 4 photographs, from above the product table 3, the photography range including the entirety of the article disposition area of the product table 3. The camera 4 may be of any type if the camera 4 can photograph the products on the product table 3, or the products in the basket on the product table 3, as an image in such a state as to be able to extract product identification information for use in a product recognition process. For example, the camera 4 is composed of a CCD camera or the like. In addition, the camera 4 may be configured to photograph invisible light. The camera 4 may include a plurality of cameras. The camera 4 is not restricted to a specific configuration.

The 3D camera 5 photographs a distance image in the photography range of the camera 4 as depth information from a predetermined position. In the configuration example illustrated in FIG. 1, the 3D camera 5 photographs a distance image in the photography range of the camera 4 as depth information by photographing the product table 3 from above. Specifically, the 3D camera 5 shown in FIG. 1 acquires depth information relative to a to-be-photographed surface of a product placed on the product table 3.

For example, the 3D camera 5 can be realized by a camera which acquires depth information by a ToF (Time-of-Flight) method. The 3D camera 5 of the ToF method measures a distance to a subject, based on a flight time (delay time) of light from when light was emitted from a light source to when the light reflected from a target reaches a sensor, and the velocity of light. The 3D camera 5 is not limited to the ToF method, and may be configured to acquire the depth information from a parallax by using a stereoscopic camera or a plurality of cameras. Additionally, the 3D camera 5 may be configured to project a dot pattern and to acquire depth information from a distortion of the dot pattern. Additionally, it should suffice if the 3D camera 5 acquires depth information, and the 3D camera 5 may be replaced with a distance sensor or the like.

The display (display unit) 6 is a display device which displays various kinds of information. The display 6 is, for instance, a liquid crystal display. The display 6 includes a display panel and a driving circuit which causes the display panel to display a screen. The display panel is, for instance, a display device such as a liquid crystal display or an organic EL display.

The operation panel (operation unit) 7 is a user interface for an operator to input various operational instructions. The operation panel 7 transmits the data of the operational instruction, which the operator inputs, to a controller. The operation panel 7 is, for instance, a keyboard, numeric keys, and a touch panel. In addition, the operation panel 7 may accept an input of a gesture from the user.

Besides, the display 6 and operation panel 7 may be a display device including a touch panel. Here, it is assumed that the operation panel 7 is a touch panel and is formed integral with the display 6.

The settlement unit 8 is a device for settling payment of products. The settlement unit 8 may be any device which can settle the payment of products. For example, the settlement unit 8 may be a device which processes a credit card for settling the payment of products. Additionally, the settlement unit 8 may receive the payment of products by an electronic money function which an electronic device such as a mobile terminal or an IC card includes. Additionally, the settlement unit 8 may process cash for settling the payment of products. Additionally, the settlement unit 8 may settle the payment of products by registered information of a user who was successfully authenticated by personal authentication such as biometrics authentication. For example, the settlement unit 8 may be configured to photograph a payer's face, and to execute settlement (electronic settlement) by using registered information of the user who was successfully authenticated by a face authentication process based on the photographed face image. Incidentally, the settlement unit 8 may include a function of executing a settlement-related process, as well as the function of receiving the price of products. For example, the settlement unit 8 may execute a membership authentication process by a membership card or the like, and may execute a process of giving points to a storage medium (e.g. a card) which the user possesses.

In the meantime, the display 6, operation panel 7 and settlement unit 8 may be disposed at arbitrary positions. For example, the display 6, operation panel 7 or settlement unit 8 may be formed integral with the housing 2. The settlement apparatus 1 may be configured such that any one of, or all of, the display 6, operation panel 7 and settlement unit 8 are omitted.

In addition, the settlement apparatus 1 may include a structure for illumination, etc. Besides, the settlement apparatus 1 may include a detection unit which detects that a product (or a basket) was placed on the product table 3. The settlement apparatus 1 may start a settlement process including a product recognition process, upon detecting that the product (or basket) was placed on the product table 3.

Next, a configuration example of the control system of the settlement apparatus 1 will be described.

Figure 2:
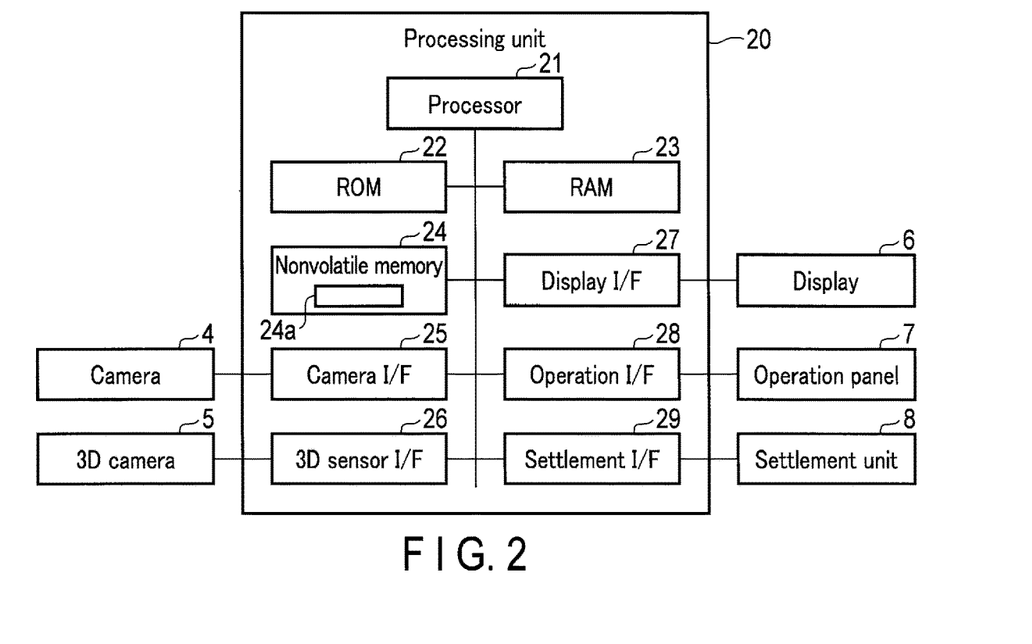
FIG. 2 is a block diagram illustrating a configuration example of a control system of the settlement apparatus.

FIG. 2 is a block diagram illustrating a configuration example of the control system of the settlement apparatus 1.

As illustrated in FIG. 2, the settlement apparatus 1 is configured such that the camera 4, 3D camera 5, display 6, operation panel 7 and settlement unit 8 are connected to a processing unit 20. The processing unit 20 includes a processor 21, a ROM 22, a RAM 23, a nonvolatile memory 24, a product database (DB) 24a, a camera I/F (first interface) 25, a 3D camera I/F (second interface) 26, a display I/F (third interface) 27, an operation I/F 28, and a settlement I/F 29.

The processor 21 controls the entirety of the settlement apparatus 1. The processor 21 is, for example, a CPU. The processor 21 realizes various processes, based on programs and control data which the ROM 22 or nonvolatile memory 24 stores. For example, the processor 21 executes operational control of the settlement apparatus 1 and various processes, such as the settlement process, by executing the programs which the ROM 22 stores.

In the meantime, some of various functions (to be described later), which the processor 21 realizes, may be realized by hardware.

The ROM 22 is a nonvolatile memory which prestores programs for control, and control data. The ROM 22 is assembled in the settlement apparatus 1 in the state in which the ROM 22 stores the control programs and control data at the stage of manufacture. Specifically, the control programs and control data, which are stored in the ROM 22, are assembled in advance according to the specifications of the settlement apparatus 1.

The RAM 23 is a volatile memory. The RAM 23 functions as a working memory. The RAM 23 temporarily stores, for instance, data which the processor 21 is processing. The RAM 23 stores an application program, based on an instruction from the processor 21. In addition, the RAM 23 may store data which is necessary for executing the application program, and an execution result of the application program.

The nonvolatile memory 24 is composed of, for example, a data writable/rewritable nonvolatile memory. For example, the nonvolatile memory 24 is composed of an HDD (hard disk drive), an SSD (solid state drive), an EEPROM, or a flash memory. The nonvolatile memory 24 stores control programs, application programs and various data corresponding to purposes of operational use of the settlement apparatus 1.

The nonvolatile memory 24 includes the product database (DB) 24a. The product DB 24a stores information (product information) relating to products (registered products) which are targets of the product recognition process. Incidentally, the product DB 24a may be provided in an external apparatus which is communicable via a communication interface. The product DB 24a stores, with respect to each of registered products, product information such as a product code, a product name, a price and a product category, and product identification information for use in the product recognition process. The product identification information includes characteristic information for recognizing the product from a photography image, information (outer-shape information) indicative of the outer shape (contour) of the product, and information (height information) indicative of the height of the product. The outer-shape information may be, for example, the coordinates of four corners corresponding to a rectangular surface of a product. Additionally, the outer-shape information may be information indicative of the shape of the contour of the product in a case of viewing, from above, the product placed on the product table 3. Additionally, the outer-shape information may be information indicative of the area of the product in a case of viewing, from above, the product placed on the product table 3.

The camera interface (I/F) 25 is an interface for connecting the camera 4 and processing unit 20. The processor 21 and camera 4 input/output data to/from each other via the camera I/F 25. The camera I/F 25 functions as an image acquisition unit which acquires an image which the camera 4 photographed. For example, the processor 21 instructs, via the camera I/F 25, the camera 4 to photograph an image, and acquires the image which the camera 4 photographed.

The 3D camera interface (I/F) 26 is an interface for connecting the 3D camera 5 and processing unit 20. The processor 21 and 3D camera 5 input/output data to/from each other via the 3D camera I/F 26. The 3D camera I/F 26 functions as a distance acquisition unit which acquires a distance image (depth information) which the 3D camera 5 photographs. For example, the processor 21 instructs, via the 3D camera I/F 26, the 3D camera 5 to photograph a distance image, and acquires the distance image which the 3D camera 5 photographed.

The display device interface (display I/F) 27 is an interface for connecting the display 6 and processing unit 20. The processor 21 and display 6 input/output data to/from each other via the display I/F 27. The display 6 displays a screen, based on a display control which is delivered from the processor 21 via the display I/F 27.

The operation device interface (operation I/F) 28 is an interface for connecting the operation panel 7 and processing unit 20. The processor 21 and operation panel 7 input/output data to/from each other via the operation I/F 28. The operation panel 7 supplies information, which is input by an operation member, such as a touch sensor, a keyboard or numeric keys, to the processor 21 via the input I/F 28.

In the meantime, the settlement apparatus 1 may include a speaker which outputs sound for an alert. In this case, the processing unit 20 includes an interface for a connection to the speaker. The speaker may be configured to produce sound, based on control from the processor 21 which is connected to the speaker via the interface.

The settlement unit interface (settlement I/F) 29 is an interface for connecting the settlement unit 8 and processing unit 20. The processor 21 and settlement unit 8 input/output data to/from each other via the settlement I/F 28. For example, the processor 21 instructs a settlement amount to the settlement unit 8, and receives a result of reception of the settlement amount from the settlement unit 8. Depending on the mode of the settlement process, the processor 21 may execute the settlement process, based on information obtained from the settlement unit 8 via the settlement I/F 29.

Next, the relationship between a photography image captured by the camera 4 and an unidentified area will be described.

The camera 4 photographs a photography range including the entirety of the product table 3, from above the product table 3. The processor 21 detects image areas of all products existing in a photography image which the camera 4 photographed. In addition, the processor 21 checks whether an unidentified area, which occurs due to overlapping of products, exists in the photography image which the camera 4 photographed. Specifically, the settlement apparatus according to the present embodiment recognizes all products existing in the photography image, and confirms whether an unidentified products exists in the photography image.

Figure 3A:
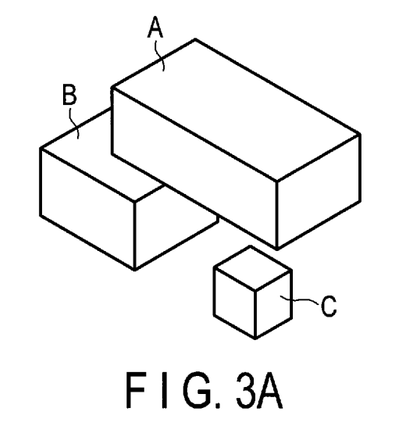
FIG. 3A is a view illustrating an arrangement example of a plurality of products which are settlement targets of the settlement apparatus.
Figure 3B:
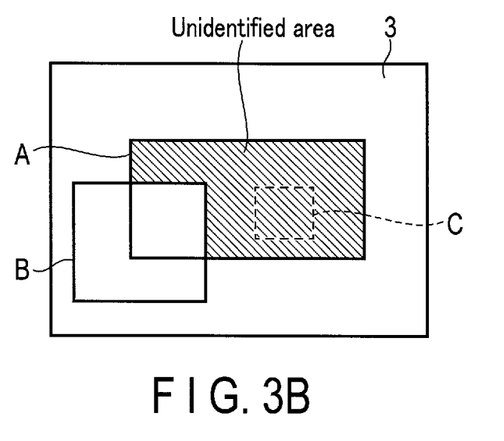
FIG. 3B is a view illustrating an example of a photography image captured by photographing the products shown in FIG. 3A.

FIG. 3A is a view illustrating an arrangement example of a plurality of products on the product table 3. FIG. 3B is a view illustrating an example of a photography image captured by photographing the products in the arrangement state illustrated in FIG. 3A.

FIG. 3A illustrates a state in which three products (product A, product B and product C) are placed on the product table 3. As illustrated in FIG. 3A, a part of the product A lies on the product B. The product C exists at that part of the product A, which does not overlap the product B.

If the area including the three products in the state illustrated in FIG. 3A is photographed, a photography image as illustrated in FIG. 3B is obtained. The photography image shown in FIG. 3B includes an image of the upper surface of the product A, and an image of a part of the upper surface of the product B. Thus, the existence of at least the product A and product B can be detected from the photography image. However, an image of the product C does not exist in the photography image shown in FIG. 3B. Thus, the existence of the product C cannot be detected from the photography image shown in FIG. 3B.

Specifically, in the arrangement state illustrated in FIG. 3A, a lower-side area of that part of the product A, which does not overlap the product B, becomes an area (unidentified area) where the existence of a product cannot be detected from the photography image. When an unidentified area exists, the settlement apparatus 1 cannot recognize a product in the unidentified area, and, therefore, there is a possibility that the settlement apparatus 1 cannot carry out an exact settlement process. Thus, after confirming the absence of an unidentified area in the photography image, the settlement apparatus 1 of this embodiment executes the settlement process on the products which the settlement apparatus 1 recognized from the photography image. In addition, when the settlement apparatus 1 detected an unidentified area in the photography image, the settlement apparatus 1 retries the product recognition process, or stops the settlement process.

Next, the settlement process in the settlement apparatus 1 according to the present embodiment will be described.

Figure 4:
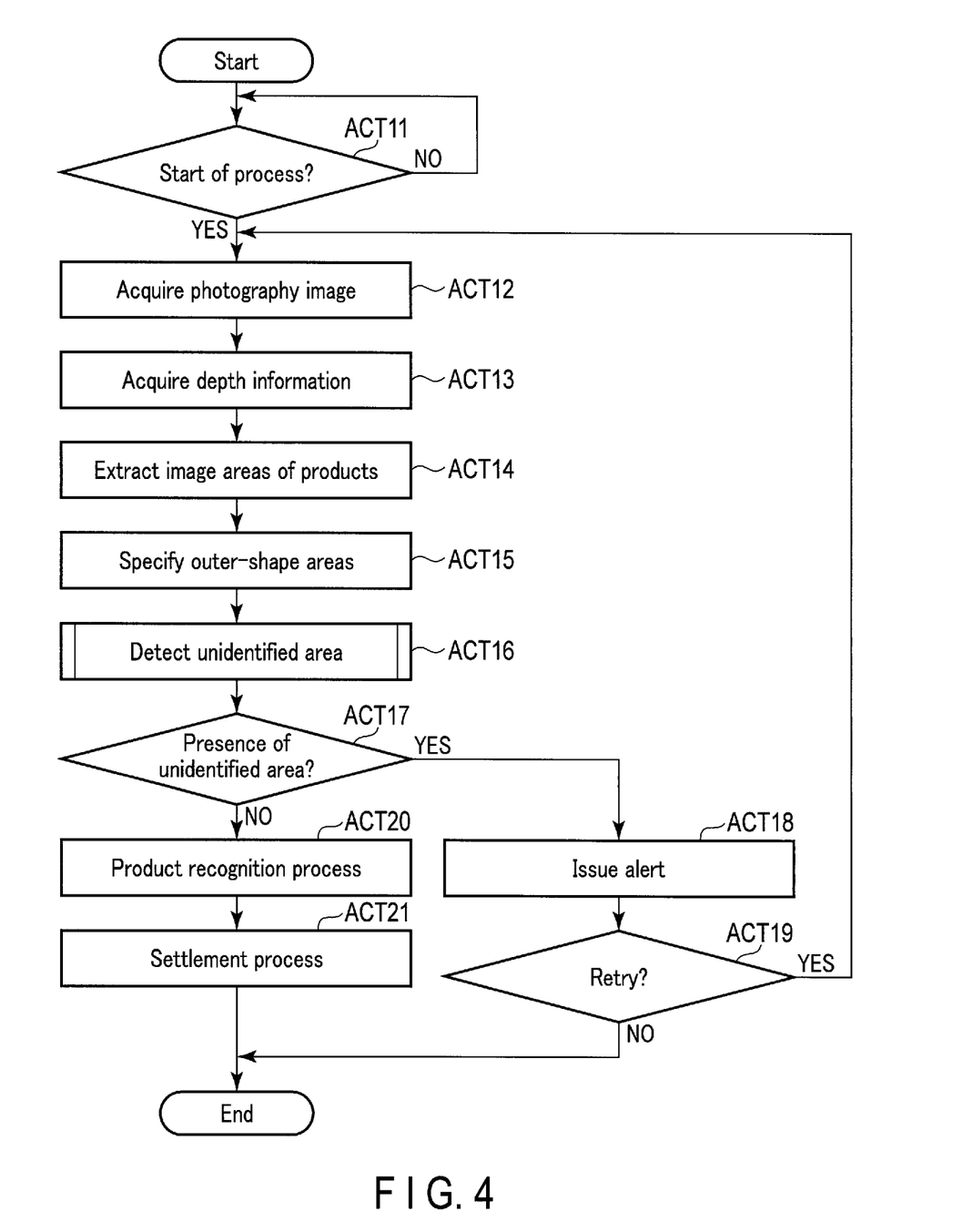
FIG. 4 is a flowchart for describing a flow of a settlement process by the settlement apparatus.

FIG. 4 is a flowchart for describing an example of the settlement process in the settlement apparatus 1 of the embodiment.

In a standby state, the processor 21 accepts a start instruction of the settlement process (ACT 11). For example, the processor 21 starts the settlement process, responding to an instruction of a start button provided on the operation panel 7. The start button is a button for instructing the start of the settlement process on the products which are set on the product table 3. The start button may be an icon which the display 6 displays, or may be a hard key provided on the operation panel 7. In addition, the processor 21 may start the settlement process, responding to a sensor detecting that products or a basket was placed on the product table 3. Besides, the processor 21 may start the settlement process, upon detecting the appearance of a person or a specific movement of a person.

Upon starting the settlement process (ACT 11, YES), the processor 21 instructs the camera 4 to photograph. Responding to the instruction of the processor 21, the camera 4 photographs a photography range including a product disposition area of the product table 3. The processor 21 acquires, via the camera I/F 25, a photography image which the camera 4 photographed (ACT 12). The processor 21 stores the photography image, which the processor 21 acquired from the camera 4, in the memory such as the RAM 23.

In addition, after starting the settlement process, the processor 21 instructs the 3D camera 5 to photograph a distance image indicative of depth information, as well as instructing the camera 4 to photograph. Responding to the instruction of the processor 21, the 3D camera 5 photographs the distance image as depth information of an area corresponding to the photography range of the camera 4. The processor 21 acquires, via the 3D camera I/F 26, the distance image which the 3D camera 5 photographed (ACT 13). The processor 21 stores the distance image, which the processor 21 acquired from the 3D camera 5, in the memory such as the RAM 23.

Here, it is assumed that the distance image is information (e.g. three-dimensional coordinate values) in which information indicative of depth is added to each coordinate value of each position in the photography image. Additionally, the distance image which the 3D camera photographs, and the photography image which the camera 4 photographs, are configured such that the coordinates of photography positions of the distance image and the photography image correspond to each other. In the meantime, based on the distance or view angle between the camera and the 3D camera, the processor 21 may execute such a process as aligning the distance image and photography image. Besides, the distance image may be information indicative of a height from the surface of the product table 3, on which the articles are placed, at each position in the photography image.

Upon acquiring the photography image and the distance image corresponding to the photography image, the processor 21 extracts an image area of each product existing in the photography image, by using the acquired distance image (ACT 14). For example, based on the distance image, the processor 21 specifies, as a background area in the photography image, an area of the surface of the product table 3 on which the products are placed (or the bottom surface of the basket in which the products are placed). Upon specifying the background area from the distance image, the processor 21 specifies the image areas of the respective products by separating the background area and other area in the photography image. In addition, based on the distance image, the processor 21 divides the area into areas each having a substantially equal distance (depth), and specifies the image area of each product from each divided area. Incidentally, the method of specifying the image area of each product from the photography image is not limited to a specific method. For example, the background area in the photography image may be detected based on an image pattern of the surface of the product table 3, on which the articles are placed.

Upon extracting the image area of each product in the photography image, the processor 21 specifies (estimates) the outer-shape area of each of the products extracted as image areas (ACT 15). For example, if the outer shape of a product is rectangular, the processor 21 specifies the coordinates of the four corners of the rectangular outer-shape area of the product, as the information indicative of the outer-shape area of the product. Additionally, if the outer shape of a product is pentagonal, the processor 21 may specify the coordinates of the five points that are apices of the pentagon, as the information indicative of the outer-shape area of the product. Additionally, if the outer shape of a product is circular, the processor 21 may specify a plurality of coordinates (coordinates of an edge) indicative of the circle (or ellipse) as the outer shape of the product. Specifically, the processor 21 specifies the information indicative of the outer-shape area in accordance with the shape of each product. In the description below, it is mainly assumed that the outer shape of each product is rectangular.

Here, an example of the method of specifying the outer-shape area of each product in the photography image will be described.

Figure 5A:
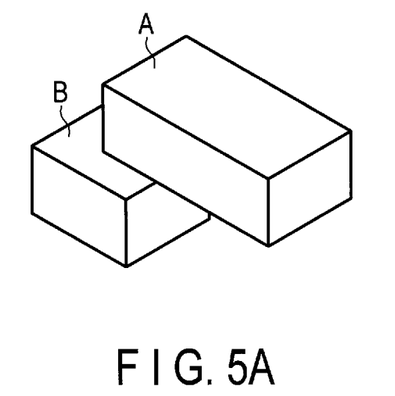
FIG. 5A is a view illustrating an arrangement example of a plurality of products which are settlement targets of the settlement apparatus.
Figure 5B:
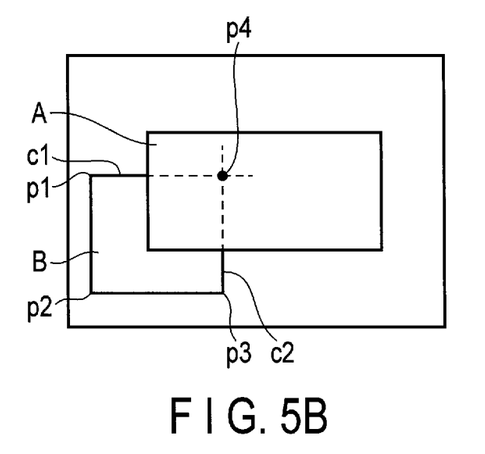
FIG. 5B is a view illustrating an example of a photography image captured by photographing the products shown in FIG. 5A.

FIG. 5A and FIG. 5B are views for describing an example of the method of specifying the outer-shape areas of products. FIG. 5A is a view illustrating an arrangement example of a plurality of products, and FIG. 5B is a view illustrating an example of a photography image captured by photographing the products in the arrangement state shown in FIG. 5A.

As illustrated in FIG. 5A, when a product A and a product B are placed in an overlapping manner, if the product A and product B are viewed from above, there exists an area hidden by the product A that is laid over a part of the product B. This area hidden by the product A is an unidentified area. In the example shown in FIG. 3B, the product C, which is disposed in the unidentified area, becomes an unidentified product. For example, the outer-shape area of the product B, which includes an area hidden by the product A, can be specified by extracting a rectangle with a smallest surrounded area.

In addition, in the photography image shown in FIG. 5B, three corners p1, p2 and p3 appear in the image area of the product B. These three points p1, p2 and p3 can be directly specified from the image area of the product B in the photography image. A fourth corner, which indicates the outer-shape area of the product B and exists in an area that is invisible in the photography image, can be specified as an intersection point p4 between extension lines of a side c1 and a side c2 which are in contact with the invisible area in FIG. 5B. Thereby, the outer-shape area of the product B can be specified as coordinates of the four points p1, p2, p3 and p4 shown in FIG. 5B. Specifically, the outer-shape area of the rectangular product can be specified by specifying, from the coordinates of the three corners appearing in the image area of the product, the coordinates of the other corner that does not appear in the photography image.

Upon specifying the outer-shape area of each product in the photography image, the processor 21 executes an unidentified area detection process of determining the presence/absence of an unidentified area (ACT 16). For example, the processor 21 detects an unidentified area by checking the relationship of inclusion between outer-shape areas of respective products. Incidentally, the detection method of an unidentified area will be described later.

If the processor 21 detects an unidentified area in the unidentified area detection process (ACT 17, YES), the processor 21 issues an alert on the occurrence of an error (ACT 18). For example, the processor 21 displays, on the display 6, an alert that an unidentified area exists, or that settlement is not possible. Additionally, the processor 21 may display on the display 6 a photography image of the state in which plural products overlap, as illustrated in FIG. 3B or FIG. 5B. Additionally, the processor 21 may display on the display 6 a photography image depicting the outer-shape areas of the respective products. Additionally, the processor 21 may issue an alert for a salesclerk, instead of an alert for the operator. Additionally, the processor 21 may produce an alarm notifying the operator of the occurrence of an error by a speaker or the like.

After issuing the alert in response to the detection of the unidentified area, the processor 21 accepts an instruction to retry the settlement process (product recognition process) (ACT 19). For example, the processor 21 retries the settlement process in accordance with an instruction to a retry button provided on the operation panel 7. The retry button may be an icon which the display 6 displays, or may be a hard key provided on the operation panel 7. If the retry is instructed (ACT 19, YES), the processor 21 returns to ACT 12, acquires a photography image once again, and executes the above-described process once again. In the meantime, when the processor 21 detected the unidentified area, the processor 21 may finish the settlement process of the products existing in the area other than the unidentified area, and may execute a settlement process of a product existing in the unidentified area.

On the other hand, if the processor 12 determines the absence of the retry instruction (ACT 19, NO), the processor 21 stops the settlement process, and transitions to the standby state. For example, if the retry is not instructed for a predetermined time period, the processor 12 determines the absence of the retry instruction. If the processor 12 determined the absence of the retry instruction, the processor 21 may display on the display 6 an alert that the settlement process is to be stopped. In addition, even when the processor 21 detected the unidentified area, the processor 21 may finish the settlement process without issuing the alert, and may transition to the standby state.

In addition, if the processor 21 detected no unidentified area in the photography image (ACT 17, NO), the processor 21 executes a product recognition process of recognizing each product with respect to the image area of each product extracted from the photography image (ACT 20). In the product recognition process, the processor 21 specifies which product in the extracted image areas of products corresponds to which product registered in the product DB 24*a*.

The product recognition process is not limited to a specific method if the process can recognize all products existing in the photography image which the camera 4 photographed. The product recognition process recognizes each product existing in the photography image by using product identification information. For example, the product recognition process may be a process of recognizing a product by using, as the product identification information, an identification pattern such as a bar code, a two-dimensional code, characters, numerals or a mark. In this case, the identification pattern, such as a bar code, a two-dimensional code, characters, numerals or a mark, is provided on at least one surface of the product.

For example, the processor 21 may use a method of specifying the product, based on the bar code existing in the image area of the product. In this case, the processor 21 acquires a bar code area from the image area of the product. Upon acquiring the bar code area, the processor 21 executes a decode process on the acquired bar code area. Upon decoding the bar code, the processor 21 collates a product code, which was obtained by decoding the bar code, and product codes of registered products registered in the product DB 24*a*. The processor 21 identifies the product having the coincident product code in the collation process. Incidentally, the method of acquiring the bar code area is not restricted, and may be, for instance, a method of detecting a bar code area by specifying an area with a strong high-frequency component.

In addition, the product recognition process may be a process of recognizing products by using characteristic information such as characteristic amounts extracted from images of individual products in the photography image. In this case, the characteristic information as the product identification information is a characteristic amount extracted from the image of a product photographed from a specific direction. The product recognition process by the characteristic amount extracted from the image of the product is not limited to a specific method, if the process can identify the product from the image area of the product in the photography image. For example, the product recognition process may be a method of identifying the product by using the characteristic amount of the image, such as a density gradient or a color histogram in the image area of the product. In this case, in the product DB 24*a*, the characteristic amount corresponding to specific method, such as the density gradient or color histogram in the image of the product, is registered as the characteristic information of the registered product. The method of identifying the product by the characteristic amount obtained from the image of the product is advantageous in that the product can be identified even when the bar code is not visible.

Upon recognizing (identifying) each product existing in the photography image in the product recognition process, the processor 21 executes the settlement process on each product (ACT 21). In the settlement process, the processor 21 specifies the price of each product by referring to the product information of each product registered in the product DB 24*a*, and determines the total price of all products as the settlement amount. Upon determining settlement amount, the processor 21 executes a process of receiving the settlement amount from the operator by using the settlement unit 8.

Next, an example of the unidentified area detection process for detecting an unidentified product in the photography image will be described.

Figure 6:
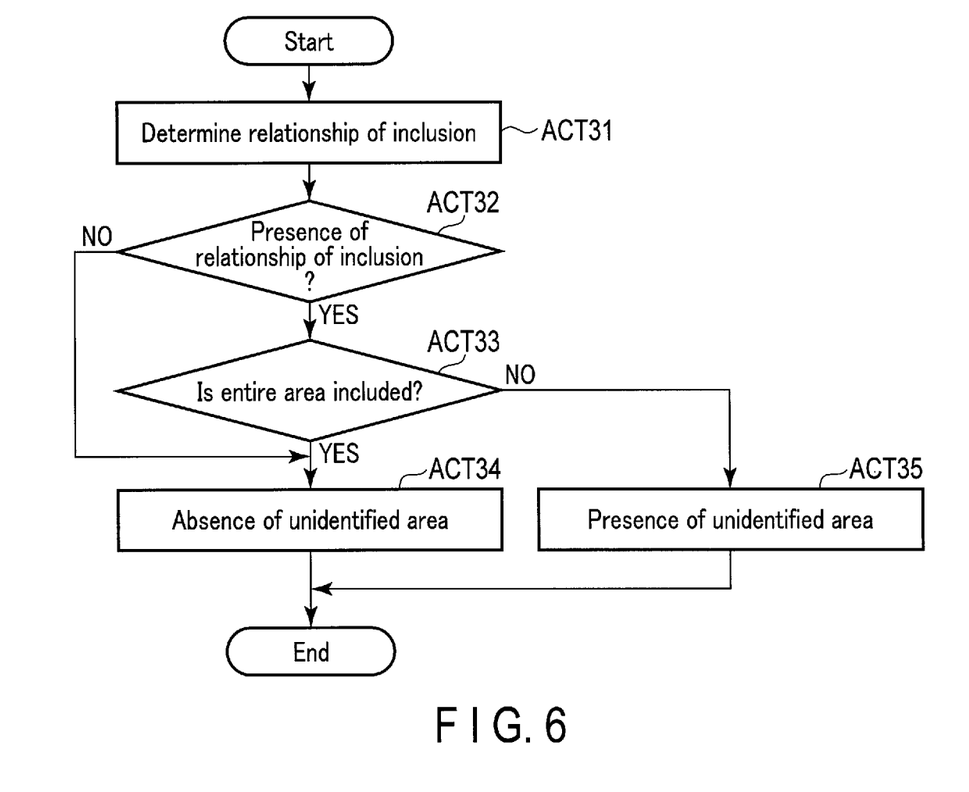
FIG. 6 is a flowchart for describing a flow of an unidentified area detection process by the settlement apparatus.

FIG. 6 is a flowchart for describing an example of the unidentified area detection process by the settlement apparatus 1.

The processor 21 determines a relationship of inclusion between the outer-shape area of each product extracted from the photography image and the outer-shape area of some other product (ACT 31). The processor 21 determines whether the image area of each product in the photography image is included in the outer-shape area of the other product, which is specified from the outer-shape information (e.g. the coordinates of four corners) of the other product. To begin with, the processor 21 selects products in the order beginning with the product having a shortest depth distance (i.e. in the order beginning with the product that is positioned uppermost) from among the image areas of the products extracted from the photography image. The processor 21 determines whether the image area of the selected product with the shortest depth distance is included in the outer-shape area (the area of the outer shape obtained from outer-shape information) of the product of the image area having a greater depth distance than the image area having the shortest depth distance (i.e. the product at a lower height level than the product with the shortest depth distance). In other words, the processor 21 determines whether any one of coordinates indicative of the image area of the selected product (e.g. coordinates of four corners of the image area of the selected product) is included in the outer-shape area of the other product (ACT 32).

Figure 7A:
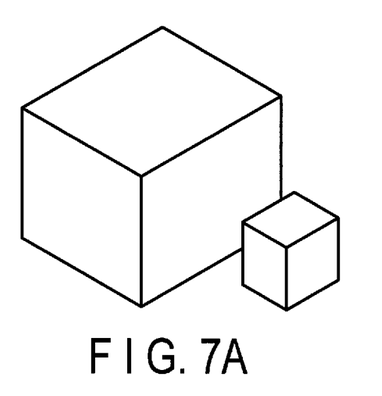
FIG. 7A is a view illustrating a first arrangement example in a case in which no unidentified area occurs due to two products which are recognition targets of the article recognition apparatus functioning as the settlement apparatus.
Figure 7B:
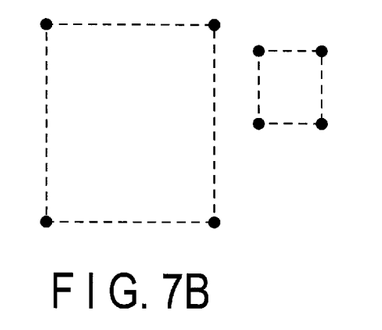
FIG. 7B is a view illustrating outer-shape areas of the two products in the arrangement state shown in FIG. 7A.

If the processor 21 determines that the image area of the selected product is not included in the outer-shape area of the other product (i.e. there is no relationship of inclusion) (ACT 32, NO), the processor 21 determines that there is no unidentified area in connection with the selected product (ACT 34). For example, FIG. 7A illustrates an arrangement example of products in a case where there is no relationship of inclusion. FIG. 7B is a view illustrating outer-shape areas of the products shown in FIG. 7A. Specifically, when the outer-shape areas of the respective products are independent from each other, as illustrated in FIG. 7B, the processor 21 can determine (confirm) that the products do not overlap, as illustrated in FIG. 7A.

If the processor 21 determines that the image area of the selected product is included in the outer-shape area of the other product (ACT 32, YES), the processor 21 determines whether the entirety of the image area of the selected product is included in the outer-shape area of the another product (ACT 33). In other words, the processor 21 determines whether all of the coordinates indicative of the image area of the selected product (e.g. coordinates of four corners of the image area) are included in the outer-shape area of the other product. If the entirety of the image area of the selected product is included in the outer-shape area of the other product, this means that there is a certain product other than the selected product, but there is no product which is invisible in the photography image and lies under the selected product. Specifically, when the entirety of the image area of the selected product is included in the outer-shape area of the other product, the processor 21 can determine that there is no unidentified area.

Figure 8A:
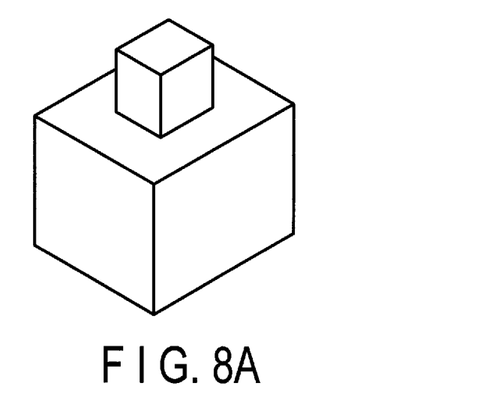
FIG. 8A is a view illustrating a second arrangement example in a case in which no unidentified area occurs due to two products which are recognition targets of the article recognition apparatus functioning as the settlement apparatus.
Figure 8B:
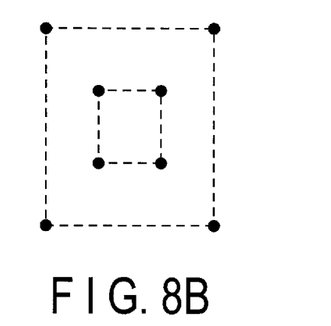
FIG. 8B is a view illustrating outer-shape areas of the two products in the arrangement state shown in FIG. 8A.

If the processor 21 determines that the entirety of the image area of the selected product is included in the outer-shape area of the other product (ACT 33, YES), the processor 21 determines that there is no unidentified area in connection with the selected product (ACT 34). For example, FIG. 8A illustrates an arrangement example of two products in a case where the entirety of the image area of a certain product is included in the outer-shape area of another product lying under the certain product. FIG. 8B is a view illustrating outer-shape areas of the products shown in FIG. 8A. Specifically, as illustrated in FIG. 8B, the entirety of the image area (outer-shape area) of an upper-side product is completely included in the outer-shape area of a lower-side product. In this case, the processor 21 can determine (confirm) that no unidentified area occurs due to overlapping between products, as illustrated in FIG. 8A.

Figure 9A:
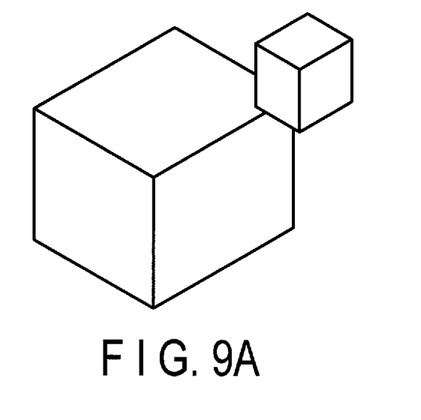
FIG. 9A is a view illustrating an arrangement example in a case in which an unidentified area occurs due to two products which are recognition targets of the article recognition apparatus functioning as the settlement apparatus.
Figure 9B:
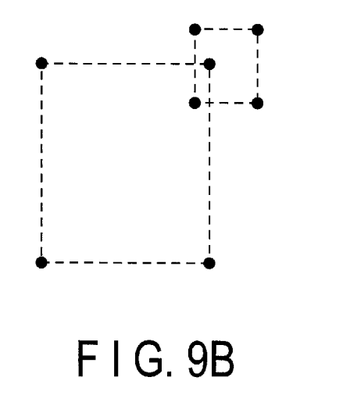
FIG. 9B is a view illustrating outer-shape areas of the two products in the arrangement state shown in FIG. 9A.

If the processor 21 determines that the entirety of the image area of the selected product is not included in the outer-shape area of the other product (i.e. if the processor 21 determines that only a part of the image area of the selected product is included in the outer-shape area of the other product) (ACT 33, NO), the processor 21 determines that there is an unidentified area in connection with the selected product (ACT 35). For example, FIG. 9A illustrates an arrangement example of two products in a case where an unidentified area occurs. FIG. 9B is a view illustrating outer-shape areas of the products shown in FIG. 9A. Specifically, as illustrated in FIG. 9B, the image area (outer-shape area) of an upper-side product is not completely included in the outer-shape area of a lower-side product, and only a part of the image area (outer-shape area) of the upper-side product is included in the outer-shape area of the lower-side product. In this case, the processor 21 determines (confirms) that an unidentified area occurs due to overlapping between products, as illustrated in FIG. 9A.

By the above-described process of ACT 31 to ACT 35, the processor 21 detects an unidentified area with respect to the image area of the selected product. The processor 21 executes the process of ACT 31 to ACT 35 on the image areas of all products extracted from the photography image. Thereby, the processor 21 detects an unidentified area in the entirety of the photography image.

In the meantime, the unidentified area detection method is not limited to the above-described method. For example, a product recognition process on each product may be executed, and an unidentified area may be detected by a comparison between the product information of the product registered in the product DB 24a and the image of the product acquired from the photography image (for example, by an area difference between the area of the product registered in the product DB 24a and the area of the product image extracted from the photography image).

As described above, the settlement apparatus according to the embodiment confirms the presence/absence of an unidentified area in the photography image, and executes a settlement process on all products recognized from the photography image when there is no unidentified area. When the settlement apparatus detected an unidentified area, the settlement apparatus issues an alert without executing the settlement process. According to this settlement process, a settlement process is prevented from being executed with a price lower than the actual price of all products that are settlement targets, due to the presence of a product in the unidentified area.

Incidentally, in the above embodiment, the case was described in which the programs, which the processor executes, are prestored in the memory in the apparatus. However, the programs, which the processor executes, may be downloaded into the apparatus via a network, or may be installed in the apparatus from a storage medium. The storage medium may be of any type, such as a CD-ROM, if the storage medium can store programs and the apparatus can read the storage medium. Besides, the functions obtained by preinstall or download may be functions which are realized in cooperation with an OS (operating system) or the like in the apparatus.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A settlement method comprising:
    acquiring an image captured by photographing a photography area where articles that are recognition targets are arranged;
    acquiring depth information from a predetermined position relative to the photography area;
    extracting image areas of all articles existing in the image based on the depth information;
    determining whether an unidentified area exists in the image due to overlapping of a plurality of the articles, based on the extracted image areas of the articles; and
    executing a settlement process corresponding to a result of an article recognition process for each of the image areas of the articles, if the unidentified area is not determined to exist in the image, wherein
    the settlement process corresponding to the result of the article recognition process for each of the image areas of the articles is not executed, if the unidentified area is determined to exist in the image.

2. The settlement method of claim 1, further comprising:
    specifying an outer-shape area of each of the articles with respect to the image area of each of the articles extracted from the image; and
    detecting the unidentified area, based on the specified outer-shape area of each of the articles.

3. The settlement method of claim 2, further comprising:
    detecting the unidentified area, based on a relationship between the image area of an article extracted from the image and the outer-shape area of another article extracted from the image.

4. The settlement method of claim 1, further comprising:
    issuing an alert that the unidentified area exists, if the unidentified area is determined to exist in the image.

5. The settlement method of claim 1, further comprising:
    controlling a display device to display an image indicating the unidentified area in the image, if the unidentified area is determined to exist in the image.

* * * * *